United States Patent Office 2,806,015
Patented Sept. 10, 1957

2,806,015

HOMOGENEOUS POLYMER BLENDS

Roland J. Kern, Dayton, Ohio, assignor to Monsanto Chemical Company, St. Louis, Mo., a corporation of Delaware No Drawing. Application May 27, 1953,
Serial No. 357,895

2 Claims. (Cl. 260—45.5)

This invention relates to blends of polymers. In one aspect it pertains to compatible, homogeneous blends of two particular polymeric materials. In other aspects it pertains to films, molded articles, extruded articles, and clear single-phase homogeneous solutions, of such blends.

Pure single polymers are often employed industrially for the formation of films, polymer solutions, emulsions, extrusions, and compression molded or injection molded articles. However, for a particular use it is often desirable to modify one or more of the physical properties. Simple admixture of another polymer would appear to be the simplest method of accomplishing this. However, it is a general rule that two polymeric materials, even though rather closely related as to molecular structure and molecular weight, are not completely compatible. Incompatibility manifests itself in a number of ways. Thus, when films are formed from a mixture of polymers, the incompatibility of the polymers may be shown by cloudiness of the film or by the presence of isolated islands or pockmarks of one polymer caused by separation of components in an otherwise clear film. Incompatible polymers, when dissolved in an organic solvent, result in the formation of two or more separate layers. Molded articles made from an incompatible mixture of polymers are either cloudy or if clear become whitened very readily on repeated flexing. Polymer systems wherein two or more polymers are compatible with each other are very unusual. When they occur, the phenomenon is not common to all mixtures of two given polymers but rather to mixtures of the two particular polymers only within narrow limits of proportions of the two polymers.

Compatible mixtures of polymers have the extremely important advantage of clarity, that is to say the polymer in any form e. g., film, molding, extrusion, or solution, is perfectly clear and transparent. They have the added advantage of giving, in a molded or extruded product, a high surface gloss. Incompatible polymer systems, particularly when subjected to injection molding but also when compression molded or extruded often appear to undergo a phase separation at the surface, believed to be caused by the higher melting point component solidifying first on contact with the cool mold. This resulted in a heterogeneous surface. The surface then has poor gloss which is a definite commercial drawback.

An object of this invention is to provide polymer blends. Another object of the invention is to provide clear homogeneous blends of polymers. A further object is to provide a mixture of two polymers, which mixture is homogeneous and compatible irrespective of the proportions of the two polymers. A further object is to provide a clear homogeneous one-phase solution of two polymers. Yet another object is to provide a clear homogeneous film of a blend of two polymers. A further object is to provide molded articles made from a compatible blend of polymers. A still further object is to manufacture extruded articles from a compatible blend of polymers. Yet another object is to provide molded and extruded articles made from a mixture of polymers yet having high surface gloss. Further objects and advantages of the invention will be apparent to those skilled in the art from the accompanying disclosure and discussion.

The essence of my invention is based upon my discovery that a polymer of an acrylate ester of a primary alkanol, and a polymer of a vinyl ester of a saturated fatty acid the non-carboxylic residue of which has the same structure as said primary alkanol, are compatible with each other in all proportions. For example, polymethyl acrylate and polyvinyl acetate are compatible with each other in all proportions. Similarly, poly-n-propyl acrylate and polyvinyl butyrate are compatible with each other in all proportions. As indicated hereinabove, this is a remarkable and very useful discovery in view of the fact that hardly any multi-component polymer systems are known in which the components are compatible in all proportions.

In one aspect the invention provides a composition of of matter comprising an intimate compatible homogeneous blend of a polymer of a monomer having the formula

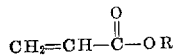

and a polymer of a monomer having the formula

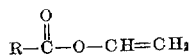

wherein R is a primary alkyl group and is the same in both said monomers. It is preferred that said R be unbranched, i. e., that R be a normal alkyl group. Preferred compounds of the foregoing two structural formulae are those wherein R contains from 1 to 8 carbon atoms. It is in the polymers of such compounds having a comparatively small number of carbon atoms that differences among polymers are particularly marked, hence the complete compatibility is especially surprising and valuable. As examples of R in the foregoing formulae there can be mentioned, by way of illustration and not limitation, methyl, ethyl, n-propyl, n-butyl, isobutyl, 2-methylbutyl, 2-ethylbutyl, 2-isopropylbutyl, 2-ethylhexyl, n-octyl, n-hexyl, n-dodecyl, and the like. Those skilled in the art will recognize that compounds meeting the foregoing requirements, but containing non-hydrocarbon substituents that do not interfere with the compatibility of the polymers which is the essential feature of the invention, will be equivalents for this particular purpose.

For the sake of illustration and convenience of discussion, the invention in its various aspects will be discussed with particular reference to polymers of vinyl acetate and polymers of methyl acrylate. It will be understood that the following discussion referring to these two specific polymers and their blends is also applicable to polymers and blends thereof meeting the requirements stated in the foregoing paragraph.

In accordance with one embodiment of the invention, a mixture of polyvinyl acetate and polymethyl acrylate is prepared by milling the two polymers together on conventional plastics mills under conditions which do not result in degradation of polymers but form an intimate admixture of the two materials. The resulting composition of matter is a clear, intimate, compatible blend of polyvinyl acetate and polymethyl acrylate. There can also be incorporated into the resulting polyblend, either after it has been prepared by milling or while the intermixture of the two polymers is being accomplished, any of the usual fillers, pigments, plasticizers, dyes, stabilizers and other materials that are customarily incorporated in plastics for various purposes. A compatible blend of polyvinyl acetate and polymethyl acrylate, either with or without added materials, can be formed into useful shapes or articles by known means. Thus, it can be subjected to injection molding, or extrusion into tubes, films, filaments and the like. Conditions and methods for accomplishing all of these procedures are so well-known that it would be superfluous to describe them in detail here. As has been pointed out, resulting products will have a high surface gloss. Furthermore, in the absence of opaque fillers, such as pigments, extenders, etc., the articles of manufacture are clear, i. e., transparent. As used in the claims, the term, "being characterized, in the absence of opaque fillers, by clarity and homogeneity," describes both articles that do not contain opaque fillers and articles that do contain opaque fillers but that are made of blends of polyvinyl acetate with polymethyl acrylate and therefore, if such opaque filler were not present, would be clear and homogeneous.

In another and preferred embodiment of the invention, blends of polyvinyl acetate with polymethyl acrylate can be prepared, not by milling, but rather by dissolving the two polymers in the chosen proportions, in a common solvent, i. e., a solvent capable of dissolving both polymers. Among such solvents can be mentioned acetone, dioxane, benzene, chloroform, tetrahydrofuran. Any amount of solvent sufficient to dissolve the polymers is satisfactory and this amount will depend to some extent on the particular solvent chosen. Solutions can be made having from 1 to 20 weight percent solids and even higher. The solution can be admixed with a non-solvent for the polymer, e. g., methyl alcohol, water, hexane, etc., resulting in the coprecipitation of the two polymers in an intimately mixed form. The resulting material is separated from liquid, dried, and then employed in any desired way. If desired, it can then be milled to effect its intermixture with other materials, of the nature described above, or such other materials can be present in the solution and thus during the coprecipitation. Injection molded, compression molded and extruded articles, films and solutions, can be made from a polymer blend prepared in the manner just described.

In still another embodiment of the invention, a solution of polyvinyl acetate and polymethyl acrylate can be prepared as described in the foregoing paragraph in any suitable solvent, with or without added materials of the nature described, and a film then cast from the polymer solution or "dope" in known manner. When this is done, the solvent should be sufficiently volatile to evaporate under commercial conditions at a practical rate for giving a satisfactory film. Procedures for film casting are well-known and need no detailed description here. Such a dope can also be used in dry spinning fibers and filaments in known manner, wherein the solution is forced out through an opening or a plurality of openings of chosen dimensions and the solvent rapidly evaporated leaving the desired filament. Alternatively, the solution of the two polymers in a suitable organic solvent can be used to form films and filaments in known manner, by "wet" processes wherein a film or filament is extruded into a liquid which is a non-solvent for the polymer but a solvent for the particular solvent used in the polymer solution.

When polyvinyl acetate and polymethyl acrylate are dissolved in an organic solvent, the resulting solution is clear and homogeneous and exists in only one phase. This is most unusual, because in most cases in which two polymers are dissolved in a solvent two liquid phases separate out. The homogeneous single phase solution can be used in any of the manners described above. Films, filaments, etc. formed from such solutions by either dry or wet casting or spinning procedures are clear and homogeneous and do not show evidence of separation of two solid phases.

Another method for obtaining an intimate blend of polymethyl acrylate and polyvinyl acetate involves mixing an emulsion of one with an emulsion of the other. Such emulsions are most conveniently prepared by emulsion polymerization of the monomer. The mixed emulsion can be used directly for casting a film, or can be coagulated and the coagulum washed and dried to give a blend to be used in any desired manner.

That the polyvinyl acetate/polymethyl acrylate system is unique is appreciated particularly well by consideration of the fact that closely related systems are not compatible. Thus, for example, polyvinyl acetate is not compatible with polyethyl acrylate; polyvinyl acetate is not compatible with polymethyl methacrylate; polymethyl methacrylate is not compatible with polymethyl acrylate. Further details are given in specific examples hereinbelow.

True single phase homogeneous systems wherein two polymers are intimately admixed are fundamentally different from the heterogeneous systems usually formed by admixture of two polymers. The differences mentioned hereinbefore regarding clarity of film, homogeneity of film, action of molded articles on flexing, characteristics of solutions of two polymers, etc., demonstrate this. It is further demonstrated by a consideration of the second order transition temperature of polymer blends. Thus, when a sample of polymethyl acrylate is tested, a sample of polyvinyl acetate is tested, and a blend of the two is tested, all by the same procedure wherein the torsional modulus is determined as related to temperature as in the well-known Clash-Berg test, Ind. and Eng. Chem. 34, 1218 (1942), all three materials will show exactly the same type of behavior. The temperature point at which the torsional modulus of each undergoes the most rapid change in increasing the temperature from below the second order transition temperature up to and through the second order transition temperature, at which point the material undergoes rapid softening from a hard solid to a soft solid, is different for each of the three materials, but the shape of the curves is the same and the curve for the blend lies between the curves for the two polymers alone. On the other hand, when a blend is made of two polymers that are not compatible, the curve of torsional modulus versus temperature is entirely different in character for the blend than for the individual polymers. Thus, with polyvinyl acetate and polymethyl methacrylate, and blends of these two materials, the curve for the blend has a double inflection, and the softening temperature is spread out over a wide range of temperatures, as compared to the single inflection and the sharp softening temperature for the individual polymers. These facts illustrate the fundamental distinction between the compatible blends of polyvinyl acetate with polymethyl acrylate of the present invention, as opposed to non-compatible blends of other and closely related polymers.

The proportions of polyvinyl acetate and polymethyl acrylate to be used in the blend will, of course, depend upon the intended use of the blended polymer and desired characteristics thereof. The invention broadly covers a mixture of polyvinyl acetate with any significant amount of polymethyl acrylate blended therewith on up to a mixture of polymethyl acrylate with any significant amount of polyvinyl acetate blended therewith. In most instances, it will be desirable to have at least 5 parts by weight of the polymer present in the smaller amount in every 100 parts by weight of blend. Thus, preferred proportions are from 5 to 95 parts by weight of polyvinyl acetate blended with from 95 to 5 parts by weight of polymethyl acrylate. In order to obtain the most important advantages the blends will often contain from 25 to 75 parts by weight of polyvinyl acetate and from 75 to 25 parts by weight of polymethyl acrylate.

The invention is directed to polymers of vinyl acetate and to polymers of methyl acrylate that are thermoplastic and are of sufficient molecular weight to be normally solid, i. e., solid at room temperature, and this is the meaning to be understood by the terms "polyvinyl acetate" and "polymethyl acrylate" as used herein and in the claims. It is preferred to employ polymers having a weight average molecular weight of at least 10,000 and the molecular weight may range on up to 50,000 to 500,000 and even higher.

In practicing the invention, polyvinyl acetate and polymethyl acrylate can be used that have been prepared by any of the various known vinyl polymerization techniques. In a given blend, the two polymers may have been prepared by the same general type of technique or polymers prepared by different techniques can also be blended. The vinyl polymerization techniques are so well-known in the art that it is not deemed necessary to go into great detail here. These techniques include mass or bulk polymerization, wherein the reaction mixture is free from added solvent or other reaction medium and consists solely of monomer, resultant polymer, and catalyst, if any. Alternatively, the polymerization can be carried out in organic solvents in which either the monomer or polymer or both are soluble, or can be effected by the suspension or emulsion polymerization techniques. For suspension polymerization a reaction medium such as water is used together with a small amount of a suspending agent, for example water-soluble vinyl acetate/maleic anhydride copolymer derivatives, carboxymethylcellulose, etc., to give a suspension of particles of initial monomeric mixture which particles grow in size as the polymerization proceeds yet are not of such small size as to result in a permanently stable latex. This is called "pearl" polymerization where the particles are of quite large size. Emulsion polymerization can be effected by employing water, a sufficient amount of emulsifying agent, for example a water-soluble salt of a sulfonated long chain alkyl aromatic compound or a surface active condensation product of ethylene oxide with long chain aliphatic alcohols or mercaptans, etc., along with vigorous agitation whereby an emulsion of the monomer in water is formed and the product is obtained in the form of a latex. Such latex can then be coagulated if desired by known methods and the polymer separated from the water.

Suitable catalysts for polymerization include the "per" compounds and the "azo" compounds. Under suitable conditions the polymerization can be promoted by ultraviolet irradiation in the presence of peroxide or azo compounds or the suitable photo-sensitizers, such as organic disulfides. The peroxide-type and the azo-type polymerization catalysts are of the free-radical promoting type. Peroxide catalysts can be inorganic or organic, the latter having the general formula R'OOR" wherein R' is an organic radical and R" is an organic radical or hydrogen. These compounds are broadly termed "peroxides" and in a more specific sense are hydroperoxides wherein R' is hydrogen. By way of example of "per" compounds can be mentioned benzoyl peroxide, ditertiary butyl peroxide, tertiary butyl hydroperoxide, cumene hydroperoxide, lauroyl peroxide, hydrogen peroxide, potassium persulfate, perborates, etc. Azo-type polymerization catalysts are characterized by the presence in the molecule of the group —N=N—; the dangling valences can be attached to a wide variety of organic radicals with each one however being preferably attached to a tertiary carbon atom. By way of example can be mentioned α,α'-azodiisobutyronitrile, diazonium halides, etc.

The following examples give information on the invention as practiced in some of its preferred embodiments. However, variations in proportions of polymers, methods of making polymers, solvents, and procedures can be made without departing from the invention.

*Example 1*

Polyvinyl acetate and polymethyl acrylate, each prepared by mass polymerization, were dissolved in varying proportions in acetone. In each instance, a total of 20 grams of combined polymer was dissolved in 100 ml. of acetone. In the various solutions, the polyvinyl acetate: polymethyl acrylate weight ratio were 10:1, 2:1, 1:1, 1:2, and 1:10, respectively.

Each of the foregoing five solutions was clear and homogeneous and consisted of a single phase.

In contrast, the following mixtures of ploymers when put into solution in the same manner each gave a heterogeneous solution that settled out into two separate liquid phases:

Polyvinyl acetate/polyethyl acrylate
Polyvinyl acetate/polymethyl methacrylate
Polymethyl acrylate/polymethyl methacrylate
Polymethyl acrylate/polyethyl acrylate.

*Example 2*

Polyvinyl acetate and polymethyl acrylate, in a weight ratio of 1:1, were dissolved in acetone to make a solution containing 10 weight percent solids. This solution was poured out on a glass plate and the solvent allowed to evaporate.

The result was a thin very clear homogeneous flexible film.

The same procedure was followed with polyvinyl acetate and polyethyl acrylate in a weight ratio of 1:1. The result was a thin very clear flexible film which however was not homogeneous. The film was pocked with small islands caused by separation of components of the polymer mixture.

The same procedure was followed with polyvinyl acetate and polymethyl methacrylate in a weight ratio of 1:1. The result was a thin flexible film that was very cloudy.

*Example 3*

Polyvinyl acetate and polymethyl acrylate, in a weight ratio of 1:1, were dissolved in acetone. The resulting solution was poured into excess hexane causing coprecipitation of the polymers from solution, since the polymers are not appreciably soluble in hexane. This procedure gives a very intimate admixture of the two polymers.

The polymer mixture settled to the bottom and the excess liquid was decanted. After drying in a vacuum oven, the mixed polymer was compression molded into a disk.

The thus-molded disk was clear, had a high surface lustre, and on repeated flexing and bending did not undergo any whitening.

The same procedure was followed with polyvinyl acetate and polyethyl acrylate in a weight ratio of 1:1. The resulting molded disk was clear. However, on the first flexing, it whitened on the line of bending.

The same procedure was followed with polyvinyl acetate and polymethyl methacrylate in a weight ratio of 1:1. The resulting molded disk was white and opaque.

*Example 4*

Homopolymers of normal propyl acrylate and vinyl butyrate were separately prepared by mass polymerization. A mixture of equal weights of these two polymers was then dissolved in acetone to make a solution containing 20 weight percent solids.

The solution was clear and homogeneous and consisted of a single phase.

The solution was poured out on a glass plate and the solvent allowed to evaporate. The result was a thin very clear homogeneous flexible film. This film was similar to that formed from polyvinyl acetate and polymethyl acrylate as described in Example 2, but was more elastic, rubbery and flexible.

While the invention has been described with particular reference to several preferred embodiments thereof, it will be appreciated that variations from the details given herein can be effected without departing from the invention in its broadest aspects. As pointed out above, the description of various procedures of polymerization, polymer blending, proportions of polymers, general properties of polymer blends, and the like given herein with particular reference to polyvinyl acetate and polymethyl acrylate are generally applicable to all of the polymer pairs coming within the broad scope of the invention.

I claim:

1. A composition of matter comprising an intimate compatible homogeneous blend of from 5 to 95 parts by weight of polyvinyl butyrate and correspondingly from 95 to 5 parts by weight of poly-n-propyl acrylate.

2. A composition of matter comprising an intimate compatible homogeneous blend of from 25 to 75 parts by weight of polyvinyl butyrate and correspondingly from 75 to 25 parts by weight of poly-n-propyl acrylate.

References Cited in the file of this patent

UNITED STATES PATENTS

| 2,300,566 | Hahn et al. | Nov. 3, 1942 |
| 2,311,233 | Jaenicke et al. | Feb. 16, 1943 |

FOREIGN PATENTS

| 117,785 | Australia | Dec. 2, 1943 |

OTHER REFERENCES

Schildknecht: "Vinyl and Related Polymers," page 181, published 1952, Wiley and Sons, N. Y.

UNITED STATES PATENT OFFICE
CERTIFICATE OF CORRECTION

Patent No. 2,806,015 September 10, 1957

Roland J. Kern

It is hereby certified that error appears in the printed specification of the above numbered patent requiring correction and that the said Letters Patent should read as corrected below.

Column 3, line 9, after "molding," insert -- compression molding, --.

Signed and sealed this 3rd day of December 1957.

(SEAL)
Attest:
KARL H. AXLINE
Attesting Officer

ROBERT C. WATSON
Commissioner of Patents